Jan. 7, 1969 L. A. DRAVES 3,420,544
VEHICLE OVERLOAD SPRING WITH CAM-TYPE ADJUSTING MEANS
Filed Nov. 21, 1966

Lehi A. Draves
INVENTOR.

BY Clarence A. O'Brien
and Harvey B. Jacobson
Attorneys

United States Patent Office 3,420,544
Patented Jan. 7, 1969

3,420,544
VEHICLE OVERLOAD SPRING WITH CAM-TYPE ADJUSTING MEANS
Lehi A. Draves, Rte. 2, Lookeba, Okla. 73053
Filed Nov. 21, 1966, Ser. No. 595,848
U.S. Cl. 280—124                7 Claims
Int. Cl. B60g 9/00; B60g 11/10

ABSTRACT OF THE DISCLOSURE

An attachment for a vehicle including a frame and a wheel support portion supported from the frame for guided up-and-down movement relative to the frame, the attachment comprising an elongated leaf spring construction with one end portion supported for oscillation relative to the frame and the other end portion engaging the wheel support portion. The attachment includes shiftable abutment means for adjustably pre-bowing the leaf spring construction whereby the biasing action of the leaf spring construction on the wheel support portion of the vehicle may be varied.

---

This invention relates to an improved vehicle overload spring and more specifically to an overload spring that may be readily attached to various types of vehicles.

The instant invention comprises an improvement over the vehicle overload spring disclosed in my copending U.S. application Ser. No. 460,065, filed June 1, 1965, in that the improved overload spring includes more efficient adjusting means and additional adjusting means.

The improved vehicle overload spring of the instant invention includes an elongated spring which is oscillatably supported from a base adapted to be secured to the frame of a vehicle for oscillation about a fulcrum defining an axis of oscillation. The fulcrum is spaced intermediate the opposite ends of the spring and one end of the spring is adapted to overlie and bear down upon an axle member of an associated vehicle. The other end portion of the spring on the remote side of the fulcrum is connected to the base of the overload spring assembly in a manner such that the spring may be forced to oscillate and flex about the fulcrum thereby varying the amount of effective downward thrust applied to the associated vehicle axle.

The main object of this invention is to provide an improved vehicle overload spring constructed in a manner whereby it may be readily secured to existing vehicles as attachments therefor or incorporated into the manufacture of various types of vehicles.

Another object of this invention is to provide an overload spring in accordance with the immediately preceding object and which is adapted to be mounted upon an associated vehicle without permanent alterations to the vehicle being required.

Yet another object of this invention is to provide an overload spring in accordance with the preceding objects and which is constructed in a manner so as to be adaptable for securement to various vehicles in selected locations thereon.

A final object of this invention to be specifically enumerated herein is to provide a vehicle overload spring in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
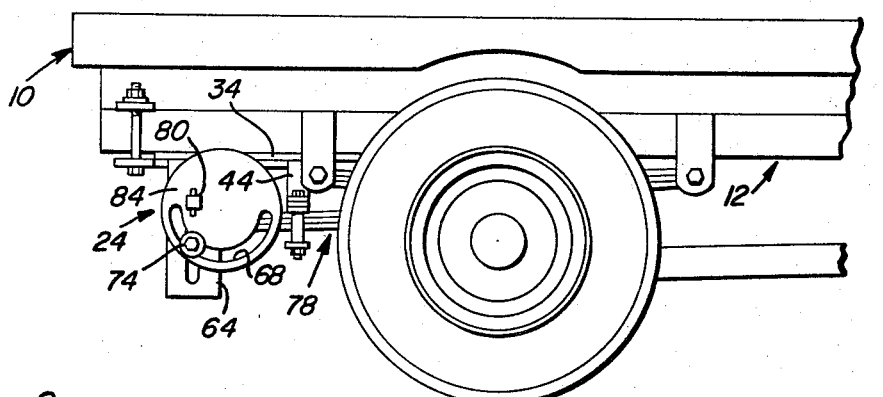
FIGURE 1 is a fragmentary side elevational view of the rear portion of a vehicle shown with the vehicle overload spring operatively mounted thereon.

Referring now more specifically to the drawings, the numeral 10 generally designates a vehicle including a frame generally referred to by the reference numeral 12. The frame 12 includes a pair of opposite longitudinal side members 14 and 16 from which an axle assembly generally referred to by the reference numeral 18 is supported by means of a pair of opposite side leaf spring assemblies 20 and 22.

The improved vehicle overload spring assembly of the instant invention is adapted to be used in pairs with each assembly secured on a corresponding side of the vehicle and engaged with the corresponding end of a transverse axle assembly. Accordingly, only one of the overload spring assemblies which are generally referred to by the reference numerals 24 will be discussed in detail.

The overload assembly 24 includes a base member 26 which is elongated and is adapted to underlie the corresponding side member of a vehicle frame such as frame 12 and a pair of clamp assemblies 28 and 30 are provided for securing the base member 26 to the associated frame side member.

The base member 26 includes end overlapped elongated members 32 and 34 whose remote ends are engaged by the clamp assemblies 28 and 30. The end of the end member 34 remote from the clamp assembly 30 is secured to the corresponding end portion of the end member 32 by means of a suitable fastener 36 and the end of the end member 32 remote from the clamp assembly 28 is secured to the mid-portion of the end member 34 by means of a depending stud 38 carried by the end member 34 secured through a bore 40 in the end member 32 by means of a suitable fastener 42.

The end of the end member 32 adjacent the stud 38 includes a pair of opposite side depending flanges 44 and 46 which terminate at their lower ends in outwardly directed apertured flanges 48 and 50. A pair of fulcrum defining plates 52 and 54 having apertured end portions are secured to the flanges 48 and 50 by means of suitable fasteners 56 and 58 passed through the flanges 46 and 48 as well as the plates 52 and 54. The fasteners or bolts 56 and 58 also pass through spacing sleeves 60 and 62 having their upper ends abutted against the undersurface of the plate 42 and a rebound limiting plate 63 also having apertured end portions through which the fasteners 56 and 58 are secured.

Figure 3:
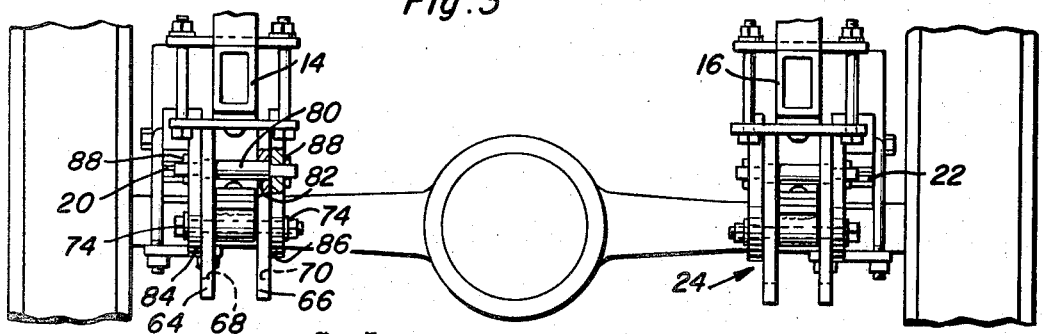
FIGURE 3 is a fragmentary rear elevational view of the assemblage illustrated in FIGURE 2.
Figure 4:
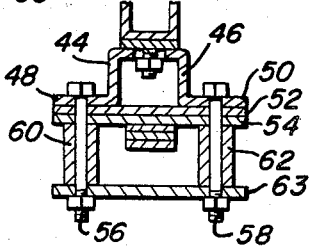
FIGURE 4 is an enlarged fragmentary transverse vertical sectional view taken substantially upon the plane indicated by the section line 4—4 of FIGURE 2.

The end of the end member 34 remote from the clamp assembly 30 includes a pair of opposite side depending flanges 64 and 66 provided with vertically extending slots 68 and 70. A cross-shaft 72 has opposite end portions thereof defining followers received in the slots 68 and secured therethrough by means of suitable retaining members 74, see FIGURE 3. The shaft 72 is received through a sleeve 76 extending transversely of and secured to one end of a leaf spring assembly generally referred to by the reference numeral 78. The other end of the leaf spring assembly 78 overlies and bears down upon the corresponding end of the axle assembly 18 and the mid-portion of the leaf spring 78 passes beneath the plate 54 between the sleeves 62.

A pivot shaft 80 has its opposite ends secured rotatably through suitable bores 82 formed in the flanges 64 and 66 and a pair of generally circular plates 84 and 86 are mounted on the opposite end portions of the pivot shaft 80 projecting beyond the flanges 64 and 66 for rotation with the pivot shaft 80. The opposite ends of the pivot shaft 80 are secured through the plates 84 and 86 by means of suitable retaining members 88. Further, the plates 84 and 86 are provided with circumferentially extending arcuate slots 90 which are in axial registry with each other and include opposite end portions spaced different radial distances from the center axis of the pivot shaft 80. The end portions of the shaft 82 disposed immediately outwardly of the opposite ends of the sleeve 76 are slidably received in the slots 90 and accordingly, upon rotation of the pivot shaft 80 and the plates 84 and 86 the shaft 72 will be adjusted in elevation longitudinally of the slots 68. The retaining elements 74 carried by the shaft 72 are threadedly engaged therewith so as to enable the retaining elements 74 to cause the plates 84 and 86 to clampingly engage therebetween the flanges 64 and 66 as well as the sleeve 76. In this manner, the shaft 72 may be secured in adjusted position along the slots 68.

Figure 2:
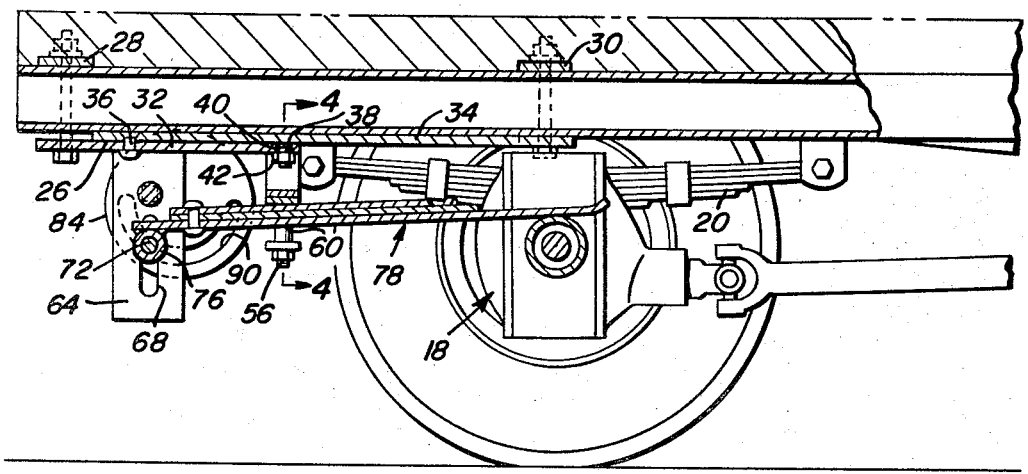
FIGURE 2 is a fragmentary enlarged longitudinal vertical sectional view taken substantially upon a plane passing through the longitudinal centerline of the vehicle overload spring.

In operation, if the leaf spring is to apply a greater force downward upon the axle assembly 18, the plates 84 and 86 may be rotated in a counterclockwise direction as viewed in FIGURE 2 of the drawings so as to cause further upward movement of the shaft 72 in the slots 68 and thereby oscillate the adjacent end of the leaf spring assembly 78 about the fulcrum defined by the plate 54 in a counterclockwise direction. Further, if it is desired, additional plates may be inserted between the plate 54 and the sleeves 60 and 62 or the plate 54 may be removed. In this manner, the fulcrum defined by the plates 52 and 54 may be vertically adjusted.

The rebound limiting member 63 limits downward swinging movement of the free end of the leaf spring assembly 78 remote from the shaft 72 and may be suitably cushioned if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle including a frame and a transverse axle member supported for guided up and down movement relative to said frame, a spring structure, said spring structure including an elongated spring, means supporting said spring from said frame and with said spring extending longitudinally of said frame and mounted for oscillation relative to said frame about a horizontal transverse axis and with one end portion of said spring overlying said axle member for engagement therewith, adjustment means supported from said frame and connected with said spring at a point spaced therealong toward the other end thereof from said one end portion for adjustably rotating said spring about said axis to vary the downward pressure of said one end portion of said spring on asid axle member, said axis of oscillation being defined by a transversely extending fulcrum surface supported from said frame and overlying said spring intermediate its opposite ends, said frame having a transverse member secured thereto for guided up and down movement relative thereto and comprising a part of said adjusting means, the other end portion of said spring disposed on the side of said fulcrum surface remote from said one end portion being secured to said transverse member for up and down adjustment therewith, a pair of spaced plate-like members rotatably supported from said frame for simultaneous rotation about a transverse axis extending therebetween, said plate-like members including registered arcuate guides whose opposite ends are spaced different radial distances from the axes of rotation of said plate-like members, said transverse member including longitudinally spaced follower portions engaged with said guides for movement therealong.

2. The combination of claim 1 wherein said spring comprises a multiple leaf spring assembly.

3. The combination of claim 1 including means operative to retain said plate-like members in adjusted rotated positions relative to said frame.

4. An attachment for a vehicle including a frame including a transverse axle member mounted for guided up and down movement relative to said frame, said attachment including a base defining a longitudinal centerline adapted to be secured to said frame with said centerline extending longitudinally of said frame, an elongated spring generally paralleling said centerline and supported from said base for oscillation about an axis extending transversely of said spring, one end portion of said spring being adapted to overlie and bear down upon said axle member, adjustment means supported from said base and connected with said spring at a point spaced therealong toward the other end thereof from said one end portion for adjustably rotating said spring about said axis to vary the downward pressure of said one end portion of said spring on said support portion, said axis of oscillation being defined by a transversely extending fulcrum surface supported from said base and overlying said spring intermediate its opposite ends, said adjustment means comprising a transversely extending surface supported from said base for vertical adjustment and passing beneath said spring on the side of said axis remote from said one end portion, said base having a transverse member secured thereto for guided up and down movement relative thereto and comprising a part of said adjusting means, the other end portion of said spring disposed on the side of said fulcrum surface remote from said one end portion being secured to said transverse member for up and down adjustment therewith, a pair of spaced plate-like members rotatably supported from said base for simultaneous rotation about a transverse axis extending therebetween, said plate-like members including registered arcuate guides whose opposite ends are spaced different radial distances from the axis of rotation of said plate-like members, said transverse member including longitudinally spaced follower portions engaged with said guides for movement therealong.

5. An attachment for a vehicle including a frame and a wheel support portion supported from said frame for guided up and down movement relative thereto and having a ground-engaging support wheel journaled therefrom, said attachment including a base defining a longitudinal horizontal centerline and adapted to be secured to said frame, an elongated spring assembly paralleling said centerline and supported from said base for oscillation about a horizontal axis extending transversely of said spring, one end portion of said spring being adapted to apply a downward force upon said wheel support portion, adjustment means supported from said base and connected with said spring at a point spaced therealong toward the other end thereof from said one end portion for adjustably rotating said spring about said axis to vary the downward pressure of said one end portion of said spring on said support member, said base having a transverse member secured thereto for guided up and down movement relative thereto and comprising a part of said adjusting means, a portion of said spring spaced longitudinally thereof from said one end portion and said axis being secured to said transverse member for up and down adjustment therewith, a pair of spaced plate-like members rotatably supported from said base for simultaneous rotation about a transverse axis extending therebetween, said plate-like members including registered arcuate guides whose opposite ends are spaced different radial distances from the axes of rotation of said plate-like members, said transverse member including longitudinally spaced follower portions engaged with said guides for movement therealong.

6. The combination of claim 5 wherein said axis of oscillation of said spring is disposed intermediate said one end portion thereof and said transverse member.

7. The combination of claim 6 wherein said transverse member is disposed adjacent and extends transversely of the other end of said spring.

References Cited

UNITED STATES PATENTS

| 3,302,941 | 2/1967 | Giovinazzo | 267—45 X |
| 1,506,039 | 8/1924 | Baker | 267—45 |
| 1,436,803 | 11/1922 | Howe | 267—45 |

PHILIP GOODMAN, *Primary Examiner.*

U.S. Cl. X.R.

267—45